United States Patent [19]

Bodewig

[11] Patent Number: 4,686,350
[45] Date of Patent: Aug. 11, 1987

[54] MIG/MAG WELDING MACHINE FOR PULSED ARC WELDING

[75] Inventor: Peter Bodewig, Ratingen, Fed. Rep. of Germany

[73] Assignee: M. K. Products, Inc., Irvine, Calif.

[21] Appl. No.: 886,216

[22] Filed: Jul. 16, 1986

[30] Foreign Application Priority Data

Jul. 20, 1985 [DE] Fed. Rep. of Germany ....... 3526054
Sep. 25, 1985 [DE] Fed. Rep. of Germany ....... 3534061

[51] Int. Cl.$^4$ .............................................. B23K 9/09
[52] U.S. Cl. .......................... 219/130.51; 219/137 PS
[58] Field of Search ...................... 219/130.51, 137 PS

[56] References Cited

U.S. PATENT DOCUMENTS 4,507,542  3/1985  Kunz et al. .................... 219/137 PS

FOREIGN PATENT DOCUMENTS 2709637  9/1978  Fed. Rep. of Germany ....................... 219/130.51

Primary Examiner—Clifford C. Shaw
Attorney, Agent, or Firm—Whann & Connors

[57] ABSTRACT

A welding machine for pulsed arc welding provided with a constant voltage source and having at least one transistor included in the welding circuit, and a pluse generator providing adjustable pulse duration and sequence frequency to provide pulsed arc.

6 Claims, 1 Drawing Figure

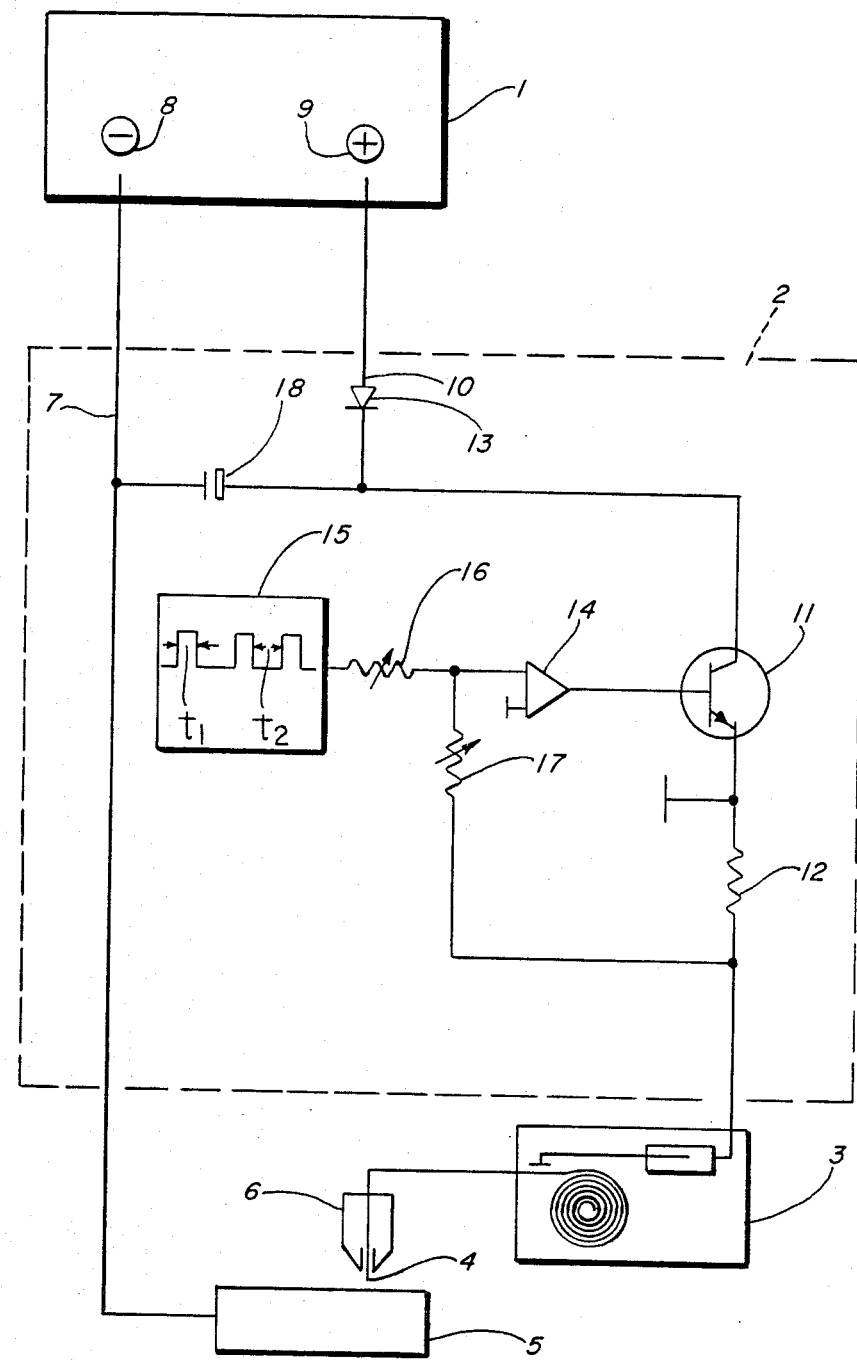

MIG/MAG WELDING MACHINE FOR PULSED ARC WELDING

BACKGROUND OF THE INVENTION

1. Field of the Invention

The invention relates to a MIG/MAG welding machine for pulsed arc welding, comprising a constant voltage source and at least one transistor included in the welding circuit and controlled by a pulse generator with adjustable pulse duration and pulse sequence frequency, wherein the pulse generator with the transistor as an additional apparatus can be included in the supply lines which extend to the welding electrode and the workpiece and are if necessary interconnected on the input side via a capacitor.

2. Background Discussion

For various applications the users of electric welding machines prefer a machine whose welding current is made up of a basic current and a pulse current superimposed thereon, rather than a machine which merely delivers d.c. as the welding current. Welding processes operating with a pulse current superimposed on the basic current are known as "pulsed arc processes".

Welding machines are commercially available which supply a basic current with a superimposed pulse current as the welding current. In such welding machines both the value of the basic current, the value of the pulse current, and the duration of the individual pulses and the pulse sequence frequency can be adjusted. These welding machines, specifically designed for such a welding current, are expensive.

In contrast, a constant voltage source with an additional apparatus can be used as a welding machine more cheaply. In such cases all that many users need to do is to purchase an additional apparatus in addition to their existing constant voltage source. The additional apparatus is designed to provide the pulse output. Since the total welding power is made up of the power of the constant voltage sources and the pulse power of the additional apparatus, as a rule the power of the constant voltage source is not fully utilized, and the welding machine constructed in this way is of excessive size. However, the additional apparatus which must provide the pulse power is also fairly expensive.

These problems do not exist in a known MIG/MAG welding machine of the kind specified, in which the total welding power is provided by the constant voltage source. The or each transistor connected in parallel is either fully operated or completely blocked via an amplifier. In the pauses between the pulses the basic current flows via an ohmic resistor connected in parallel to the transistors (German OS No. 32 17 093 A 1).

In this welding machine the basic current may take on any value during the pauses between the pulses, more particularly it may drop below the small value for maintaining the arc. However, experience shows that currents of the order of magnitude of 30–50 amps are required to maintain the arc. Another disadvantage is that the additional apparatus is connected wrongly poled to the direct voltage source. There is therefore the risk that the transistors may be destroyed.

It is an object of the invention to provide a welding machine of the kind specified which requires the user to have no special operating capacities in order to perform a perfectly satisfactory weld.

SUMMARY OF THE INVENTION

To this end according to the invention disposed in the supply line extending to the transistor and if necessary to the capacitor is a diode, and to control the welding current disposed between the pulse generator and the transistor is a controller which receives at its input, in addition to the pulses of the pulse generator, signal picked up from the base emitter resistor of the transistor and depending on the welding current.

In the welding machine according to the invention the diode acts as a protection against wrong poling. If the connecting lines are wrongly connected, there is no longer the risk that the semiconductors will be destroyed. The controller in combination with the base emitter resistor ensures that during welding the basic current does not drop below a bottom threshold value at which the maintenance of the arc becomes problematic.

DESCRIPTION OF THE DRAWING

An embodiment of the invention will now be described in greater detail with reference to the diagrammatic drawing.

DESCRIPTION OF THE PREFERRED EMBODIMENT

A welding machine comprises a constant voltage source 1, an additional apparatus 2, a wire-feeding apparatus 3 and a nozzle 6 which guides a welding wire 4 over a workpiece 5. While the workpiece is directly connected via a current supply line 7 to the negative pole 8 of the direct voltage source 1, an electronic switch 11 which takes the form of one or more transistors connected in parallel and with which a base emitter resistor 12 is in series is incorporated in a current supply line 10 connected to the welding wire 4 at the positive pole 9.

Included in the supply line 10 connected to the positive pole 9 is a diode 13 which acts as a protection against wrong poling and renders impossible reactions of the welding electrode and/or the additional apparatus 2 on the d.c. source 1. A capacitor 14 disposed between the supply lines 7, 10 linearizes possible voltage fluctuations of the source 1 and acts as an accumulator. It also protects the semiconductors if rapid changes in voltage occur on the flanks of the pulses.

The transistor 11 is connected between two states, namely between the state of complete conductivity and the state of partial conductivity. The transistor 11 has complete conductivity if its base receives control pulses from a pulse generator 15 via a variable-gain amplifier. The transistor 11 is partially conductive in the pauses tz between the pulses, if the voltage picked up at the base emitter resistor 12 and corresponding to the welding current becomes operative at the input of the variable-gain amplifier 14. The variable-gain amplification can be set up in the pauses tz between the pulses by means of two adjustable resistors 16, 17 in the control lines extending to the input of the variable-gain amplifier 14. During the pulses in the times $t_1$ the signal depending on the welding current and derived from the base emitter resistor 12 is drowned out by the signal of the pulse generator 15.

The embodiments of the invention in which an exclusive property or privilege is claimed are defined as follows:

1. In a MIG/MAG welding machine for pulsed arc welding wherein a predetermined current is maintained between a work piece and a welding electrode to provide an arc therebetween, a welding circuit comprising:
   a constant voltage source,
   transistor means having a base, a collector connected to the constant voltage source, and an emitter connected to the welding electrode through a circuit including a resistor,
   a pulse generator connected to the base of the transistor means through a circuit including amplifier means, said amplifier means having an output connected to the base of the transistor means and an input connected to the pulse generator and the resistor.

2. The welding circuit of claim 1 including diode means for protecting the transistor means against misconnection to the constant voltage source.

3. The welding circuit of claim 2 including a first variable resistor in series connection between the input of the amplifier means and the resistor connector to the emitter.

4. The welding circuit of claim 3 including a second variable resistor connected between the pulse generator and the input of the amplifier means.

5. The welding circuit of claim 2 wherein the constant voltage source has a negative pole and a positive pole with the diode connected between the positive pole and the collector, and including a capacitor connected between the negative pole and the collector.

6. In a MIG/MAG welding machine for pulsed arc welding wherein a predetermined current is maintained between a workpiece and a welding electrode to provide an arc therebetween, a welding circuit comprising:
   a constant voltage source,
   transistor means having a base, a collector connected to the constant voltage source, and an emitter connected to the welding electrode through a circuit including a resistor,
   a pulse generator connect to the base of the transistor means through a circuit including variable-gain amplifier means having an output connected to the base of the transistor means and an input connected to the pulse generator through a first variable resistor and to the resistor connected to the welding electrode through a second variable resistor, and
   diode means connected between the voltage source and the transistor means for protecting the transistor means against misconnection to the voltage source.

* * * * *